United States Patent [19]

Bjornholt

[11] 4,419,760

[45] Dec. 6, 1983

[54] AUGMENTED PHASE-LOCKED LOOP FOR VERY WIDE RANGE ACQUISITION AND METHOD THEREFOR

[75] Inventor: John E. Bjornholt, Mesa, Ariz.

[73] Assignee: Motorola Inc., Schaumburg, Ill.

[21] Appl. No.: 344,150

[22] Filed: Jan. 29, 1982

[51] Int. Cl.³ .............................................. H03B 3/06
[52] U.S. Cl. .................................... 375/120; 328/155; 329/122
[58] Field of Search ........................ 375/81, 119, 120; 328/140, 141, 155; 329/50, 104, 122; 455/260

[56] References Cited

U.S. PATENT DOCUMENTS

| | | | |
|---|---|---|---|
| 3,908,115 | 9/1975 | Waggener | 375/120 |
| 4,085,288 | 4/1978 | Viswanathan | 375/120 |
| 4,320,345 | 3/1982 | Waggener | 375/81 |
| 4,320,527 | 3/1982 | Takasaki | 375/119 |

Primary Examiner—Benedict V. Safourek
Assistant Examiner—Stephen Chin
Attorney, Agent, or Firm—Eugene A. Parsons

[57] ABSTRACT

An augmented phase-locked loop for use with a data communication system in which the data is encoded into a plurality of symbol signals such that the channel on which transmission occurs is switched at a data clock rate between symbol signals and such that two like symbol signals cannot appear successively. The coincidental transitions between symbol signals are detected and are used to lock a phase-locked loop. If the integrated signal from a transition detector is greater than integration of the signal level of the pluses on each incoming channel at the frequency of the loop locking to a subharmonic is detected and causes a sweep circuit to drive an oscillator to sweep until the phase-locked loop locks on the correct data clock frequency. The frequency to which the loop is locked is used to clock a successive sampling of each input so that if the loop is locked on a harmonic of the correct data clock, the sequential repetition of a symbol signal on a channel is detected and is used to force an oscillator to sweep until the phase-locked loop is locked to the correct data clock frequency.

7 Claims, 2 Drawing Figures

AUGMENTED PHASE-LOCKED LOOP FOR VERY WIDE RANGE ACQUISITION AND METHOD THEREFOR

BACKGROUND OF THE INVENTION

The present invention pertains, in general, to phase-locked loops for very wide range acquisition and in particular to phase-locked loops for communications systems in which data is encoded into a plurality of symbols such that a transition occurs between each symbol and such that two like symbols cannot appear successively and methods therefor.

Phase-locked loops have been used in data communication systems to track a data clock signal transmitted along with a data signal. However, in communications systems wherein the data clock is recovered in the receiver from the data stream, ambiguities in data codes that have been used have limited the range of acquisition of the phase-locked loop.

On the one hand, a digital loop using a frequency/phase detector has the capability of unambiguous locking over a wide frequency range, but cannot tolerate the sort of noisy inputs that are experienced in communication systems operating near threshold. On the other hand, a conventional analog loop is not generally capable of distinguishing a lock on a true frequency from a lock on a subharmonic or a lock on a higher harmonic of the true frequency when the input consists of narrow pulses.

Furthermore, even communications systems using an unambiguous encoding scheme cannot be used to full advantage when coupled to existing phase-locked loops which have a narrow, ambiguous locking range. In order to approach the desired capability, existing loops require a very large signal to noise ratio, such as is the case with a digital loop using a frequency/phase detector, require manually assisted coarse tuning to avoid harmonic or subharmonic locking, or require constraints placed on the data bit structure, such as a fixed bit sequence preamble at the beginning of each digital message.

SUMMARY OF THE INVENTION

Accordingly it is an object of the present invention to provide a new and improved phase-locked loop having a very wide, unambiguous locking range.

It is a further object to provide a new and improved phase-locked loop for extracting a data clock from the data stream provided by data communication systems using a multiple symbol encoding scheme wherein two like symbols cannot appear successively.

Another object of the present invention is to provide a new and improved method for very wide range acquisition in a phase-locked loop.

Among the advantages of the present invention are that it allows automatic unambiguous locking to the correct data rate under noisy signal conditions over a wide range of input data rates, without any constraints on the source data message and without manual intervention.

These and other objects and advantages of the present invention will become apparent to those skilled in the art upon consideration of the accompanying specification, claims and drawings.

In order to attain the above mentioned and other objects and advantages, the apparatus of the present invention involves a phase-locked loop for use with the system of data communication having a plurality of transmission channels and providing a sequence of symbol signals along the plurality of channels such that no channel is used for transmission twice in succession and such that the rising and falling transitions of a symbol signal on one of the plurality of channels respectively coincide with the falling transition of a signal on one other of the plurality of channels and the rising transition of a signal on one other of the plurality of channels. The phase-locked loop comprises a plurality of channel inputs coupled to a plurality of inputs of means for detecting the coincidental symbol signal transitions having an output coupled to a first input of means for controlling an oscillator which in turn has an output. An oscillator is coupled to the output of the means for controlling a voltage controlled oscillator and has an output coupled to an input of the means for controlling an oscillator. A means for comparing the provided symbol signals with an oscillating signal and with the coincidental transitions of the symbol signals has a plurality of inputs coupled to the plurality of channel inputs, has an input coupled to the output of the means for detecting the overlapping portions, has an input coupled to the output of the oscillator, and has an output coupled to a second input of the means for controlling an oscillator.

The method of the present invention involves providing a data clock signal at the output of an oscillator capable of sweeping, the data clock signal being in phase with and at the same frequency as a sequence of symbol signals transmitted along a plurality of channels, such that no channel is used for transmission twice in succession and such that the rising and falling portions of a symbol signal on one of the plurality of channels respectively coincide with the falling portion of a symbol signal on one other of the plurality of channels and the rising portion of a symbol signal on one other of the plurality of channels. The method of the present invention comprises the steps of forming a series of pulses indicative of the frequency of the coincidental transitions, producing a signal representative of any phase difference between said series of pulses and the data clock signal, driving the oscillator with a signal representative of any phase difference, comparing the frequency of the data clock signal with and with the rate of repetition of the sequence of symbol signals the frequency of the series of pulses indicative of the coincidental transitions to produce a sweep enabling signal, and using said sweep enabling signal to control the sweeping of the oscillator.

DESCRIPTION OF THE PREFERRED EMBODIMENT

Figure 1:
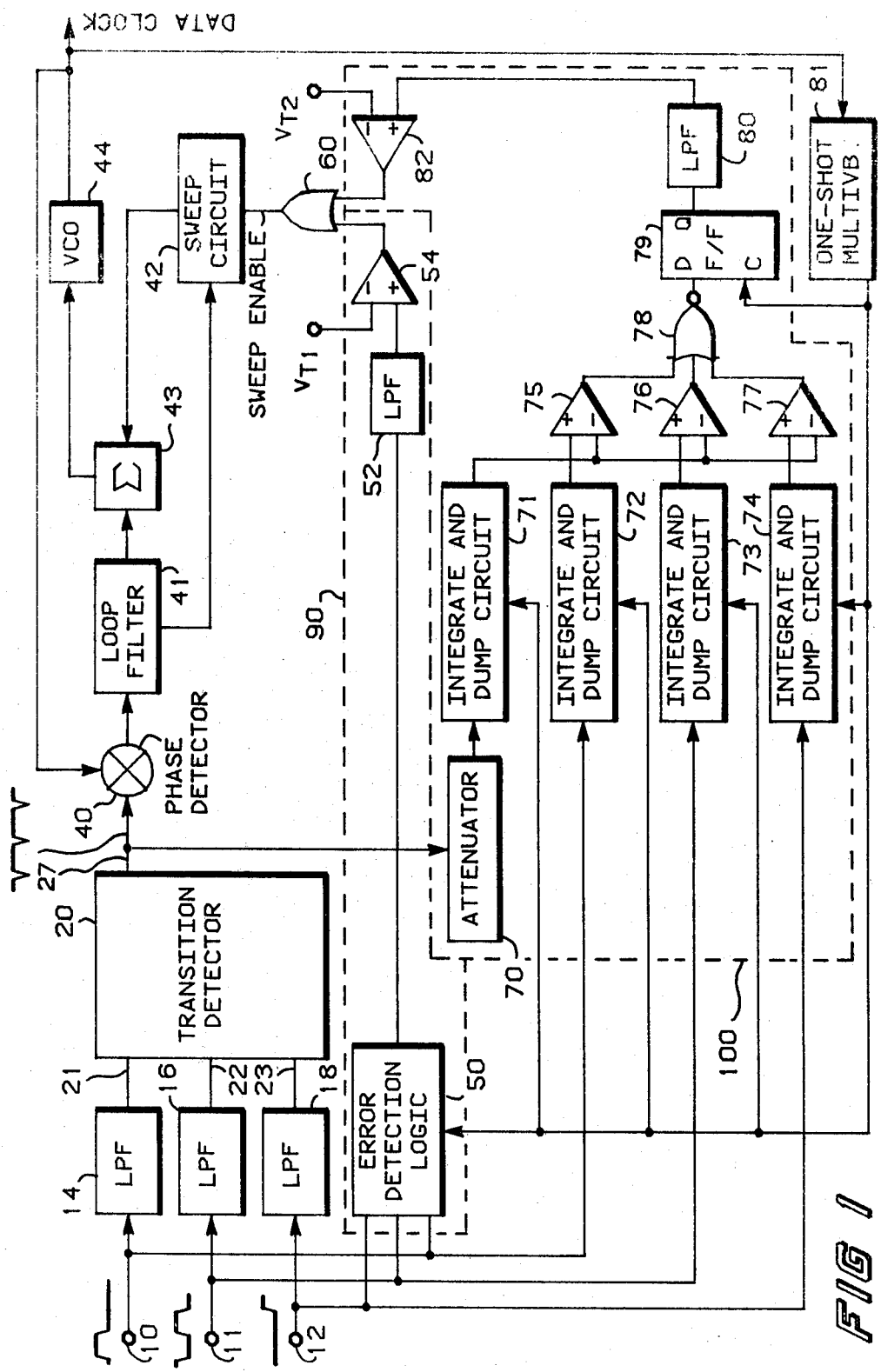
FIG. 1 is a block diagram of a preferred embodiment of the present invention.

In a preferred embodiment of the phase-locked loop according to the present invention as illustrated in FIG. 1, a channel input 10 is coupled to an input of a low pass filter 14, a channel input 11 is coupled to an input of a low pass filter 16 and a channel 12 is coupled to an input of a low pass filter 18. An output of low pass filter 14, an output of low pass filter 16 and an output of low pass filter 18 are respectively coupled to an input 21, an input 22 and an input 23 of a transition detection circuit 20 which has an output 27.

Output 27 of transition detector circuit 20 is coupled to a first input of a phase detector 40, an output of which is coupled to an input of a loop filter 41. An output of loop filter 41 is coupled to a first input of a summing circuit 43 and to a first input of a sweep circuit 42. An output of sweep circuit 42 is coupled to a second input of summing circuit 43 and an output of summing circuit 43 is coupled to an input of a voltage controlled oscillator 44. An output of voltage controlled oscillator 44 is coupled to an input of phase detector 40 and to an input of a one shot multivibrator 81.

An output of one shot multivibrator 81 is coupled to a first input of an error detection logic circuit 50, a first input of an integrate and dump circuit 71, a first input of an integrate and dump circuit 72, a first input of an integrate and dump circuit 73, a first input of an integrate and dump circuit 74, and a clock input of a type D flip-flop 79.

Error detection logic circuit 50 has a second input coupled to channel input 10, a third input coupled to channel input 11 and a fourth input coupled to channel input 12. An output of error detection logic circuit 50 is coupled to an input of a low pass filter 52 an output of which is coupled to a noninverting input of a comparator 54. An inverting input of comparator 54 is coupled to a source of threshold voltage $V_{T1}$ and an output of comparator 54 is coupled to an input of an OR gate 60.

The output of transition detection circuit 20 is further coupled to an input of an attenuator 70 an output of which is coupled to a second input of integrate and dump circuit 71. An output of integrate and dump circuit 71 is coupled to an inverting input of a comparator 75, an inverting input of a comparator 76 and an inverting input of a comparator 77.

A second input of integrate and dump circuit 72 is coupled to channel input 10 and an output of integrate and dump circuit 72 is coupled to a noninverting input of comparator 75. Likewise, a second input of integrate and dump circuit 73 is coupled to channel input 11 and a second input of integrate and dump circuit 74 is coupled to input 12 while an output of integrate and dump circuit 73 is coupled to a noninverting input of comparator 76 and an output of integrate and dump circuit 74 is coupled to a noninverting input of comparator 77. An output of comparator 75, an output of comparator 76, and an output of comparator 77 are respectively coupled to a first, a second, and a third input of NOR gate 78. An output of NOR gate 78 is coupled to a D input of flip-flop 79 and a Q output is coupled to an input of a low pass filter 80. An output of low pass filter 80 is coupled to a noninverting input of comparator 82 while an inverting input of comparator 82 is coupled to a source of threshold voltage $V_{T2}$. An output of comparator 82 is coupled to an input of OR gate 60, an output of which is coupled to a second input of sweep circuit 42.

Figure 2:
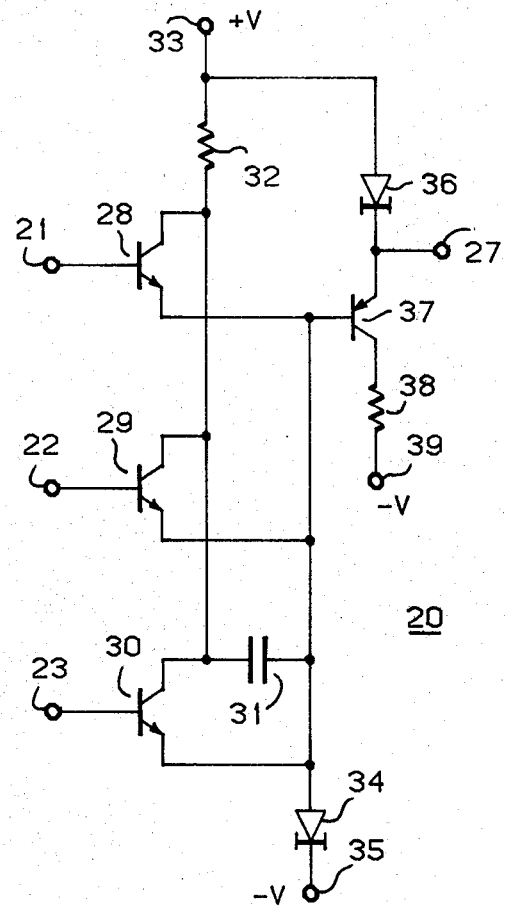
FIG. 2 is a schematic diagram of a transition detection circuit according to the preferred embodiment of the present invention.

Turning now to FIG. 2, in which like numerals refer to like elements, one implementation of transition detector 20 is illustrated. In this implementation, detector input 21 is coupled to a base of an NPN transistor 28 a collector of which is coupled to a first end of a resistor 32 and an emitter of which is coupled to a base of a PNP transistor 37. Detector input 22 is coupled to a base of an NPN transistor 29 an emitter of which is coupled to the base of transistor 37 and a collector of which is coupled to the first end of resistor 32. Similarly, detector input 23 is coupled to a base of an NPN transistor 30 an emitter of which is coupled to the base of transistor 37 and a collector of which is coupled to both the first end of resistor 32 and a first end of a capacitor 31. A second end of capacitor 31 is coupled to an anode of a current regulator diode 34, the emitters of transistors 28, 29 and 30 and to the base of transistor 37. The cathode of current regulator diode 34 is coupled to a source of negative potential 35. A second end of resistor 32 is coupled to a source of positive potential 33 and to an anode of a current regulator diode 36 a cathode of which is coupled to an emitter of transistor 37. The emitter of transistor 37 is coupled to the detector output 27 while a collector of transistor 37 is coupled to a first end of a resistor 38 the second end of which is coupled to a source of negative potential 39.

The present invention may be coupled to the receiver of a data communication system in which the data is encoded into a plurality of symbol signals, each transmitted on its own channel, such that transmission is switched among the channels between each symbol so that two like symbols cannot appear successively. Such a method of encoding and an apparatus therefor is described in a copending application entitled "Data Encoding and Decoding Communication System for Three Frequency FSK Modulation and Method Therefor," Ser. No. 344,149, filed by E. Groth on Jan. 29, 1982 and assigned to a common assignee.

Therefore, in the operation of the preferred embodiment as illustrated in FIG. 1 only one of channel inputs 10, 11 and 12 receives a pulse at any given time. Furthermore, because each information unit or group of information units of a transmitted data stream is encoded in a symbol signal, at least one of inputs 10, 11 and 12 will be high at any given time. Thus, the data clock that triggers the switching of transmission channels between symbol signals appears at inputs 10, 11 and 12 at the coincidental transition between successive symbol signals.

The coincidental transition between symbol signals is detected in the preferred embodiment of the present invention as the overlap between the falling edge of a preceding pulse and the rising edge of a following pulse. Low pass filters 14, 16 and 18 serve to slow rise and fall times in order to accentuate rise and fall times by rounding off pulses and in this way to accentuate the transition between pulses. One skilled in the art understands that simple RC circuits may be used in these low pass filters.

The detection of the transition between pulses is accomplished in transition detector 20. By an examination of FIG. 2, it can be seen that when voltage is applied to the base of one of NPN transistors 28, 29 or 30, voltage is applied to the base of PNP transistor 37 at the input level minus the base-emitter voltage drop of the NPN transistor. As the voltage at the emitter of one of transistors 28, 29 or 30 falls during the falling transition of a first pulse, the voltage at the base of transistor 37 falls until additional voltage is applied to the base of transistor 37 by the output voltage at the emitter of one other of transistors 28, 29 or 30 that rises during the rising transition of another pulse that temporally coincides with the falling transition of the first pulse. Thus, the output of the emitter of PNP transistor 37 dips to a low at the midpoint of the coincidental transition between incoming pulses to provide a series of negative peaked pulses indicative of the frequency of the switching among the channels. In this way, a series of pulses indicative of the coincidental transition between symbol signals applied to channel inputs 10, 11 and 12 and hence the data clock applied to the switching among symbol signals applied to channel inputs 10, 11 and 12 is readily obtained.

It is understood by one skilled in the art that the sources of potential, resistors and current regulator diodes shown in FIG. 2 serve to establish appropriate currents, and that capacitor 31 is used to compensate for the presence of any ac components in the signal present in the transition detector. One skilled in the art further understands that many other types of transition detectors could be devised.

The pulsed output signal from transition detector 20 is applied to phase detector 40 wherein the difference in phase between the pulses from the transition detection circuit 20 and the data clock signal from the output of voltage controlled oscillator 44 are multipled so that the output of the phase detector 40 is a function of the phase angle between the voltage controlled oscillator signal and the signal from the transition detector. After passing through loop filter 41, the signal from the phase detector 40 is passed through summing circuit 43 to drive voltage controlled oscillator 44 so that the data clock signal at the output of voltage controlled oscillator 44 tracks the signal from transition detector 20.

Error detection logic 50 compares the level of two successive signals on each of the channels and provides a high level output if two successive signals appear on any one channel. An implementation of this error detection logic is readily obtained by one skilled in the art. Such an error detection logic may operate by sampling the signals from each of the channels applied to its inputs at the rate of the data clock signal from oscillator 44 and by providing an output only when the same symbol signal is found in two successive samples of the same channel. One example of an implementation of a multiple symbol error detection logic is found in the copending application entitled "Data Encoding and Decoding Communication System for Three Frequency FSK Modulation and Method Therefor" Ser. No. 344,149, filed by E. Groth on Jan. 29, 1982, and assigned to a common assignee. The output of error detection logic 50, indicative of two successive samples having the same symbol signal value constituting a multiple symbol error, is averaged in low pass filter 52 and compared with a threshold in comparator 54. It is obvious to one skilled in the art to set the threshold voltage, $V_{T1}$, so as to provide a high level output from comparator 54 only when the number of detected repeated symbol signal errors is significant for the application to which the phase-locked loop is applied. The output from comparator 54 is applied to OR gate 60 so that when the output of comparator 54 is high, sweep circuit 42 is enabled. It is thus clear to one skilled in the art that elements 50, 52 and 54 constitute a harmonic lock detector 90.

Sweep circuit 42, when enabled drives the frequency of voltage controlled oscillator 44 through summing circuit 43 to provide coarse tuning of the phase-locked loop. Coarse tuning is accomplished through the action of an integrator within sweep circuit 42 which integrates up to a threshold and then down through a threshold and then up until the voltage controlled oscillator gains the correct frequency. In this way, if the phase-locked loop is locked on a harmonic of the data clock found in the data stream, error detection logic 50 will be clocked at its first input to recognize one symbol signal passing through one of inputs 10, 11 and 12 as more than one symbol signal and thus will detect more than one symbol signals in sequence on the same channel. The use of a detection of a multiple symbol error to drive the sweep circuit thus provides a mechanism for unlocking the phase-locked loop from a harmonic and locking the phase-locked loop on the correct frequency. The sweep circuit 42 may be any convenient circuit, such as a hysteresis amplifier and integrator, which will provide the requisite sweep signals to drive the voltage controlled oscillator 44.

If, however, the phase-locked loop is locked on a subharmonic of the correct data clock, more than one pulse will appear at channel inputs 10, 11 and 12 for each clock pulse at the output of voltage controlled oscillator 44. Therefore, each of integrate and dump circuits 71, 72, 73, and 74 will integrate over a time period greater than one pulse width. Because integrate and dump circuit 71 receives an input signal from transition detector 20 indicative of all pulses received, it will integrate to a level higher than it would otherwise integrate for a single pulse. However, integrate and dump circuits 72, 73 and 74 only receive signals indicative of the presence of a single pulse at the respective inputs 10, 11 and 12. The second input to integrate and dump circuit 71 for reception of the signal from the transition detector 20 is passed through attenuator 70 so that the level of the signal from circuit 71 is adjusted to be less than that of any one of circuits 72, 73 or 74 if the data clock at the output of voltage controlled oscillator 44 is the same as the data clock detected by transition detector 20 from the data stream but so that the level of the signal from circuit 71 will be greater than that of the others when the oscillator 44 is locked on a subharmonic. Therefore, the level of the signal at the output of each of integrate and dump circuits 72, 73, and 74 will only exceed the output of integrated dump circuit 71 if integrate and dump circuit 71 is clocked through its first input by the output of voltage controlled oscillator 44 to dump after integration of a single input pulse. When the signal at the output of transition detector 20 and the signal at the output of voltage controlled oscillator 44 are at the same frequency, the level of the signal applied to at least one of the noninverting inputs of comparators 75, 76, and 77 will be greater than the signal applied to corresponding inverting input of the same comparator. Therefore, because at least one input to NOR gate 78 is high no signal will appear at the output of NOR gate 78. On the other hand, if the phase locked loop is locked on a subharmonic of the data clock detected by transition detector 20, the level of the signal at the output of integrate and dump circuit 71 is always higher than the level of the output of any one of integrate and dump circuits 72, 73 and 74 because no one of circuits 72, 73 and 74 has received more than one pulse in succession while circuit 71 has received and has integrated the total number of pulses produced by transition detector 20 between data clock pulses received from oscillator 44. As a consequence, the level of the signals applied to the inverting inputs of comparator 75, 76 and 77 will be greater than the level of any of the signals applied to the noninverting inputs of comparators 75, 76 and 77 so that all inputs to NOR gate 78 are low and the high level output signal from NOR gate 78 is applied to the D input of flip-flop 79. One shot multivibrator 81 is used to insure that the duration of the data clock pulses applied to cause dumping of circuit 71, 72, 73 and 74 and to clock flip-flop 79 are short enough in duration such that the level of the D input of flip-flop 79 that is shifted to the Q output of 79 is indicative of only one dumping of circuit 71, 72, 73 and 74.

Therefore, if the loop is locked on the subharmonic of the signal at the output of transition detector 20 the Q output of flip-flop 79 will go high, resulting in the non-inverting input of comparator 82 going high and the sweep circuit 42 being enabled through OR gate 60. Low pass filter 80 is chosen to average the signals from the output of flip-flop 79 and the threshold voltage, $V_{T2}$, applied to the inverting input of comparator 82 is chosen so that the level of detection of subharmonic locking appropriate to the application is obtained. Therefore, whenever the phase-locked loop locks on a signal that is a subharmonic of the correct data clock, the subharmonic lock detector will cause the sweep circuit to be enabled and the voltage controlled oscillator to be driven until the data clock at the output of the voltage controlled oscillator corresponds to the data clock from the data stream that is detected by transition detector 20. It is thus clear to one skilled in the art that elements 70, 71, 72, 73, 74, 75, 76, 77, 78, 79, 80, 81, and 82 constitute a subharmonic lock detector 100.

While the present invention has been described in terms of the preferred embodiment, further modifications and improvements will occur to those skilled in the art. I desire it to be understood, therefore, that this invention is not limited to the particular form shown and I intend in the appended claims to cover all such equivalent variations which come within the scope of the invention as described.

I claim:

1. A phase locked loop for use with a system of data communications having a plurality of transmission channels and providing a sequence of symbol signals along the plurality of channels such that no channel is used for the transmission of symbol signals twice in succession and such that the rising and falling transitions of a symobl signal on one of the plurality of channels respectively coincide with the falling transition of the signal on one other of the plurality of channels and the rising transition of a symbol signal on one other of the plurality of channels, comprising:
   a plurality of channel inputs;
   means for detecting the coincidental symbol signal transitions having a plurality of inputs coupled to said plurality of channel inputs and having an output;
   means for controlling an oscillator having a first input coupled to said output of said means for detecting the coincidental symbol signal transitions, having a second input, having a third input and having an output;
   an oscillator having an input coupled to said output of said means for controlling an oscillator having an output coupled to said third input of said means for controlling an oscillator; and
   means for comparing the symbol signals with an oscillating signal and with the coincidental transitions of the symbol signals having a plurality of inputs coupled to said plurality of channel inputs, having an input coupled to said output of said means for detecting the coincidental symbol signal transitions, having an input coupled to said output of said oscillator, and having an output coupled to said second input of said means for controlling an oscillator.

2. A phase-locked loop as recited in claim 1 wherein said means for comparing symbol signals comprises means for detecting successive of symbol signals having an input coupled to said output of said oscillator, having a plurality of inputs, one each of said plurality of inputs being coupled to one of said plurality of channel inputs, and having an output coupled to said second input of said means for controlling an oscillator.

3. A phase-locked loop as recited in claim 1 wherein said means for comparing symbol signals comprises:
   a coincidental transition symbol signal integrator having an input coupled to said output of said means for detecting the coincidental symbol signal transitions and having an output;
   a plurality of symbol signal integrators, each of said plurality of symbol signal integrators having an input coupled to one of said plurality of channel inputs, and each of said plurality of symbol signal integrators having an output; and
   means for comparing integrated signal levels, said means for comparing integrated signal levels having a plurality of inputs one of said plurality of inputs being coupled to each of said outputs of said symbol signal integrators, having an input coupled to said coincidental transition symbol signal integrator, and having an output coupled to said second input of said means for controlling an oscillator.

4. A phase locked loop for use with a system of data communications having a plurality of transmission channels and providing a sequence of symbol signals along the plurality of channels such that no channel is used for the transmission of symbol signals twice in succession and such that the rising and falling transitions of a symbol signal on one of the plurality of channels respectively coincide with the falling transition of a signal on one other of the plurality of channels and the rising transition of a symbol signal on one other of the plurality of channels, comprising:
   a plurality of channel inputs;
   means for detecting the coincidental symbol signal transitions having a plurality of inputs coupled to said plurality of channel inputs and having an output;
   a phase detector having a first input coupled to said output of said means for detecting the coincidental symbol signal transitions, having a second input and having an output;
   a loop filter having an input coupled to said output of said phase detector, having a first output and having a second output;
   a summing circuit having a first input coupled to said output of said loop filter, having a second input and having an output;
   a voltage controlled oscillator having an input coupled to said output of said summing circuit and having an output;
   a sweep circuit having a first input coupled to said second output of said loop filter, having a second input and having an output coupled to said second input of said summing circuit;
   means for detecting successive repetitions having an input coupled to said output of said voltage controlled oscillator, having a plurality of inputs, one each of said plurality of inputs being coupled to one of said plurality of channel inputs, and having an output coupled to said second input of said sweep circuit;

a first integrate and dump circuit having a first input coupled to said output of said means for detecting coincidental symbol signal transitions, having a second input coupled to said output of said voltage controlled oscillator, and having an output;

a second integrate and dump circuit having a first input coupled to a first of said plurality of channel inputs, having a second input coupled to said output of said voltage controlled oscillator and having an output;

a third integrate and dump circuit having a first input coupled to a second of said plurality of channel inputs, having a second input coupled to said output of said voltage controlled oscillator and having an output;

a fourth integrate and dump circuit having a first input coupled to a third of said plurality of channel inputs, having a second input coupled to said output of said voltage controlled oscillator and having an output;

a first comparator having a first input coupled to said output of said second integrate and dump circuit, having a second input coupled to said output of said first integrate and dump circuit, and having an output;

a second comparator having a first input coupled to said output of said third integrate and dump circuit, having a second input coupled to said output of said first integrate and dump circuit, and having an output;

a third comparator having a first input coupled to said output of said fourth integrate and dump circuit, having a second input coupled to said output of said first integrate and dump circuit, and having an output; and a logic gate having a first input coupled to said output of said first comparator, having a second input coupled to said output of said second comparator, having a third input coupled to said output of said third comparator, and having an output coupled to said second input of said sweep circuit.

5. A method for providing a data clock signal output of an oscillator, the data clock signal being in phase with and at the same frequency as a sequence of symbol signals transmitted along a plurality of channels such that no channel is used for transmission twice in succession such that the rising and falling transitions of a symbol signal on one of the plurality of channels respectively coincide with the falling portion of a symbol signal on one other of the plurality of channels and the rising transition of a symbol signal on one other of the plurality of channels, comprising the steps of:

forming a series of pulses indicative of the frequency of the coincidental transitions;

producing a signal representative of any phase difference between said series of pulses and the data clock signal;

driving the oscillator with said signal representative of any phase difference;

comparing the frequency of the data clock signal with the rate of repetition of the sequence of symbol signals and with the frequency of said series of pulses indicative of the frequency of the coincidental transitions to produce a sweep enabling signal; and using said sweep enabling signal to control the sweeping of the oscillator.

6. A method for providing a data clock signal as recited in claim 5 wherein said comparing step comprises the steps of:

sampling the symbol signals on each of the channels at the rate of the data clock signal;

determining whether one symbol signal is sampled twice in succession; and outputting a sweep enabling signal when the result of said determining step is that one symbol signal is sampled twice in succession.

7. A method for providing a data clock signal as recited in claim 5 wherein said comparing step comprises the steps of:

separately integrating said series of pulses and the symbol signals for each of the plurality of channels for the period of the data clock signal; and producing the sweep enabling signal when the result of integrating said series of pulses exceeds the result of integrating the symbol signals in any one of the plurality of channels.

* * * * *